United States Patent [19]
Yum

[11] 4,140,916
[45] Feb. 20, 1979

[54] POWER EQUIPMENT

[76] Inventor: Nak I. Yum, 730 Aza Shimabukuro, Kinanakagususon Nakagamigun Okinawa, Japan

[21] Appl. No.: 745,116

[22] Filed: Nov. 26, 1976

[30] Foreign Application Priority Data

Jan. 4, 1976 [JP] Japan .................................. 51-36790

[51] Int. Cl.² ............................................ H02P 9/04
[52] U.S. Cl. .................................. 290/50; 180/65 R; 180/21
[58] Field of Search ................. 290/50; 180/65 R, 21

[56] References Cited
U.S. PATENT DOCUMENTS

| | | | |
|---|---|---|---|
| 473,871 | 4/1892 | Gardner | 290/50 |
| 1,495,347 | 5/1924 | Neubauer | 180/21 |
| 3,497,026 | 2/1970 | Calvert | 180/65 R |

*Primary Examiner*—Robert K. Schaefer
*Assistant Examiner*—John W. Redman
*Attorney, Agent, or Firm*—Donald D. Mon

[57] ABSTRACT

A power equipment includes a rotor containing a storage battery or an assembly of storage batteries, a main driving electric motor, and a generator. The rotor does a fly-wheel's function. An inertia force of the rotor gained is efficiently utilized for driving of a car and moreover the excessive inertia force is converted into electric energy and stored in the storage batteries supplying efficiently an automobile with power.

6 Claims, 16 Drawing Figures

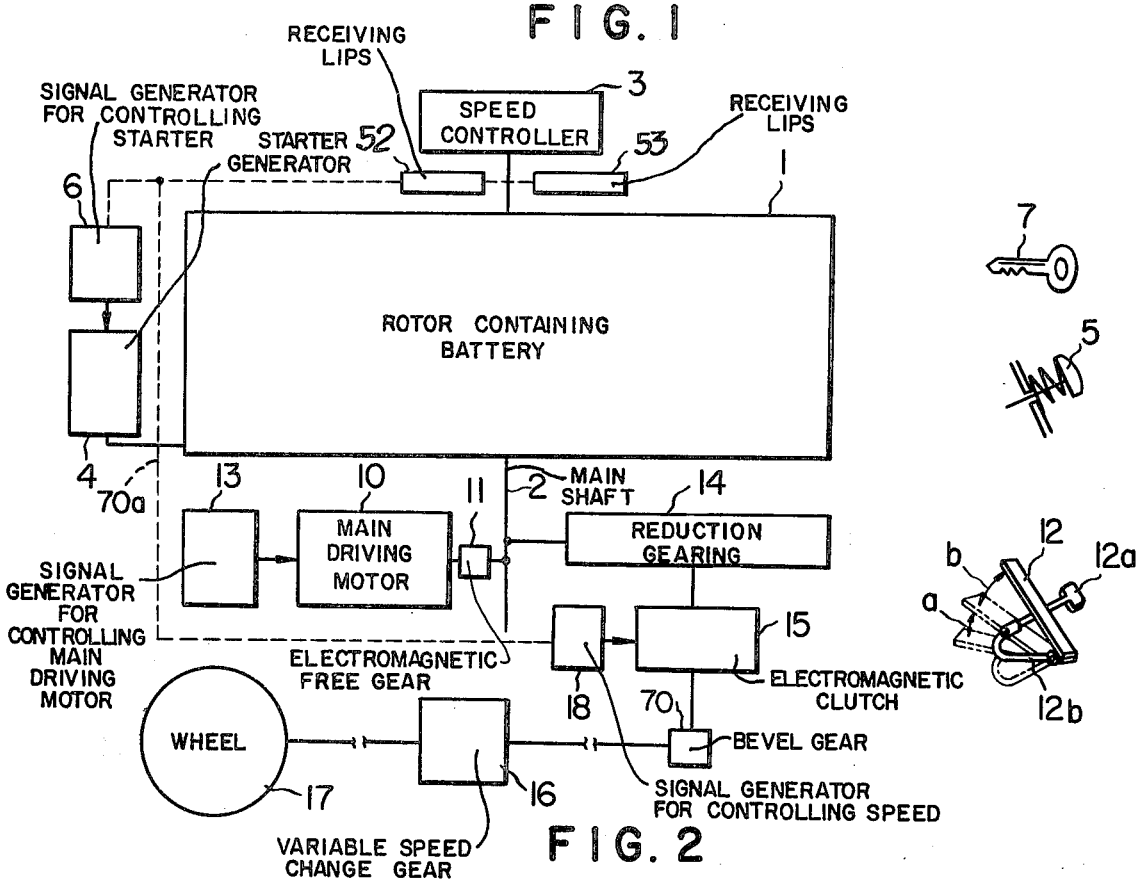
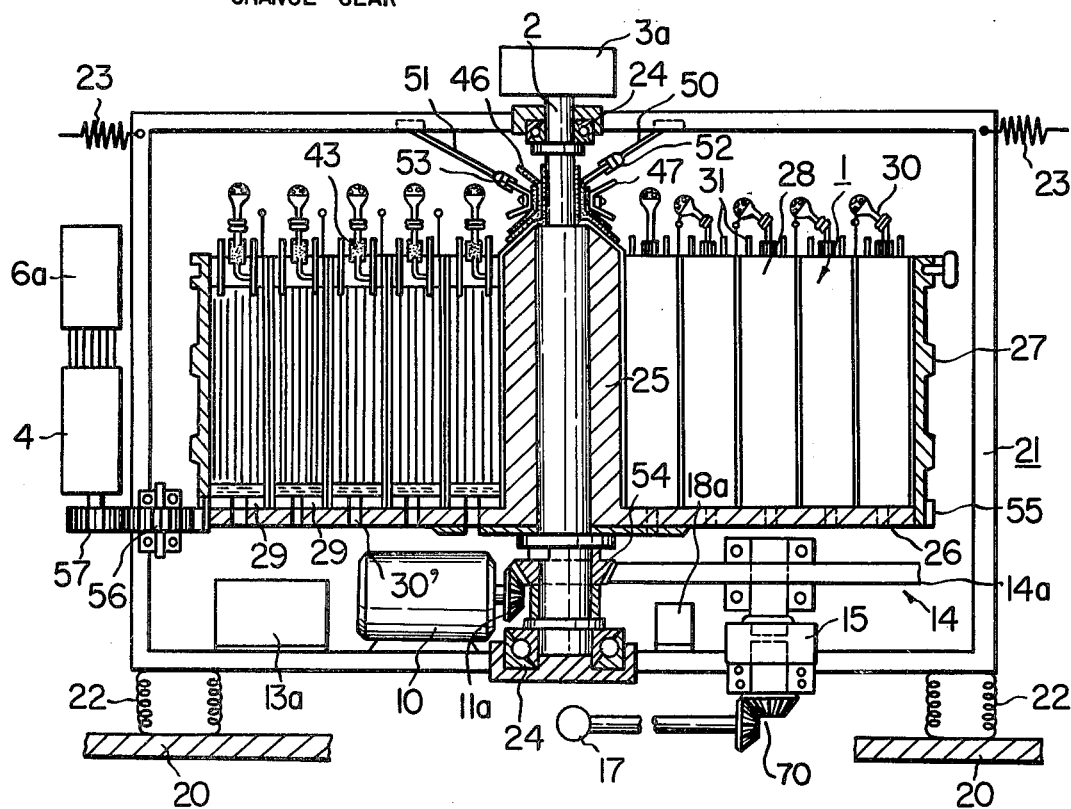

POWER EQUIPMENT

BACKGROUND OF THE INVENTION

This invention relates to a power equipment for a land vehicle such as an automobile and others, a sea vehicle, or a submarine vehicle, or a discharger such as a forklift and working cars or a working machinery and tools.

Although a power equipment which is widely used at present as that of an automobile is a gasoline engine, it has a defect that it causes harm to the public as environmental pollution due to exhaust gas thereof, and noise pollution. Therefore, a power source with storage batteries is thought to be used as a low-pollution power source. However, energy stored in storage batteries is small as compared with energy which gasoline contains. Therefore a power equipment with storage batteries has a defect that it is too large in scale and too heavy for a power equipment for an automobile to supply efficiently an automobile with power.

BRIEF SUMMARY OF THE INVENTION

Accordingly, it is an object of the invention to provide a power equipment with storage batteries supplying efficiently an automobile with power, in which a rotor containing one or plural storage batteries, filling a flywheel's function, is held to a rotary shaft and the rotor is rotated by a motion of a driving wheel of a starter which accepts an electric power from a storage battery or an assembly of storage batteries contained in the rotor and which is worked by an electric power and an inertia force of the rotor gained is efficiently utilized for driving of a car and moreover the excessive inertia force is converted into electric energy and stored in the storage battery or the assembly of storage batteries.

BRIEF DESCRIPTION OF THE DRAWING

In the drawing:

FIG. 1 is a schematic presentation in block form of a preferred embodiment of the invention.

FIG. 2 is a longitudinal section thereof.

DETAILED DESCRIPTION

Figure 3:
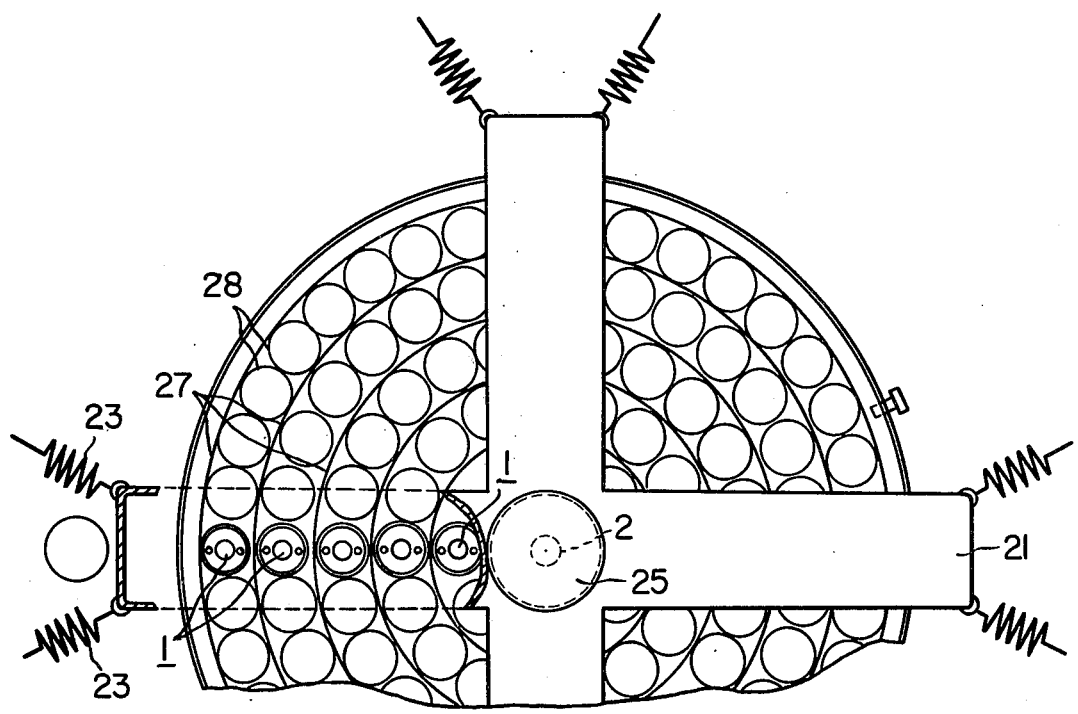
FIG. 3 is a plan view thereof, parts being broken away for clearness.
Figure 4:
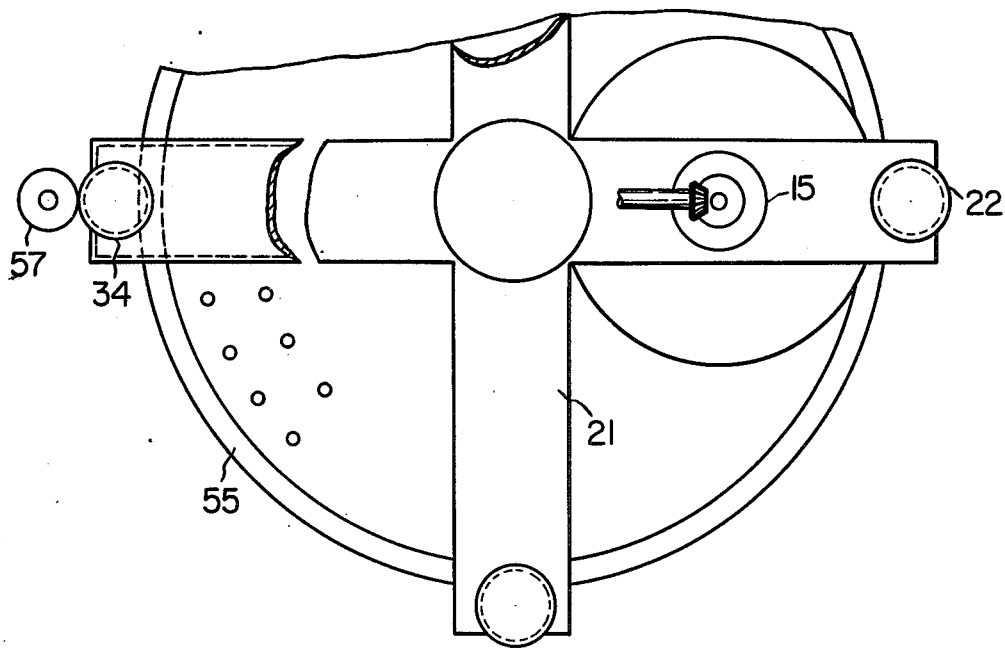
FIG. 4 is a bottom plan view thereof, parts being broken away for clearness.

Referring first to the embodiment of the invention shown in a block form in FIG. 1 a rotor containing one or plural storage batteries is shown attached to a main shaft 2 so that the rotor can rotate with rotation of the main shaft 2. A speed controller 3 is connected to the main shaft 2 for control of the speed. A starter-generator 4 which is used as both a starter and a generator is mechanically connected to the rotor. An output terminal of the starter-generator 4 is connected to a terminal of a storage battery or an assembly of plural storage batteries contained in the rotor through an overcharge checking device (not shown) and a slip ring. The starter-generator 4 is controlled by a signal from a signal generator, such as an oscillator, 6, an works usually as a generator. However the starter-generator 4 works as a motor only when a foot-treadle button 5 for starting of the starter-generator is stepped on, while electric power is turned on to the starter-generator 4 through a power key 7 while a car containing the equipment is at stop. A main driving motor 10, worked by an electrical power of one or plural storage batteries 1 contained in the rotor, is connected to the main shaft 2 through an electromagnetic free gear 11. The output of the main driving motor is controlled by an output controlling signal generated at a secondary position "a" of a primary pedal of a double pedal 12, and the electromagnetic free gear 11 idles when no signal is sent from the double pedal 12 to the electromagnetic free gear 11, whereby the main driving motor 10 is protected from needless load. The main shaft 2 is connected to a wheel 17 through a reduction gearing 14, an electromagnetic clutch 15, a bever gear 70 and a hand-operated- or automatic-fluid change gear 16. The electromagnetic attracting force of the electromagnetic clutch 15 is controlled by a signal generator 18 which generates a speed-controlling signal, at a primary position "b" of the primary pedal of the double pedal 12. However, it is assumed that a motor car is provided with gauges sensing the speed of the rotor the current delivering capacity of storage batteries, and other items.

In FIG. 1 the broken lines 70 represent electrical connections which will include the double pedal switch 12, 12a, 12b as explained above. The solid lines, such as line 2 for the shaft, interconnecting the boxes represent mechanical connections.

Operation of the equipment of this invention is now explained, in order, in starting, running, accelerated motion, and stopping.

First, the power key 7 is switched on, electric power is turned on from the rotating storage batteries to the starter-generator 4. Then, when the foot-treadle button 5 for starting of the starter-generator is stepped on, the signal generator 6 sends its controlling signal to the starter-generator 4, whereby the starter-generator 4 is directed to work as a starter, and the rotor is rotated. While the rotor is coasting at slow speed, which is checked by means of a gauge, the foot-treadle button 5 for starting of the starter-generator is released. When the foot-treadle button 5 for starting of the starter-generator is released, the starter-generator 4 begins to work automatically as a generator. Then a side auxiliary pedal 12a is stepped on lightly. The auxiliary pedal 12a is connected to a secondary pedal 12b so that the secondary pedal 12b is activated directly. The auxiliary pedal 12a is an integral part of the secondary pedal 12b, and a motion of the side auxiliary pedal 12a is identical with a motion of the secondary pedal 12b. Accordingly, when the side auxiliary pedal 12a is stepped on, this causes a signal generator 13, such as an oscillator, to send an output controlling signal to the main driving motor 10, which causes the main driving motor 10 to turn slowly. The rotation speed of the main driving motor 10, whose rotor has been slowly coasting, is now accelerated gradually and an inertia force is thereby stored. An operator will step on the side auxiliary pedal 12a in much the same manner that an operator of a gasoline engine car steps on a pedal for sending large amounts of fuel to the gasoline engine and rotating the gasoline engine with a high engine speed. While it is to ascertained by means of a gauge that the rotor is turning with a given speed and the inertia force thereof is stored, the side auxiliary pedal 12a is released and a variable speed change gear 16 is shifted to a first stage.

The main driving motor 10 is started in the above described manner. However the electromagnetic clutch 15 does not come in contact with an output shaft when an operator is not stepping on the primary pedal 12. Accordingly when a foot of an operator is idle, the car is in the same state as when the clutch is stepped on in the common car. After the variable speed change gear 16 is set to a first stage, the primary pedal 12 is stepped on slowly. Thereby a speed-controlling signal from a signal generator 18 is sent to the electromagnetic clutch 15, and the electromagnetic clutch 15 is thus connected with an output shaft. There-upon the power of the main shaft 2 is transmitted to wheels 17 through the reduction gearing 14, the electromagnetic clutch 15 and the variable speed change gear 16. Inasmuch as adjustment of friction between the electromagnetic clutch 15 and the output shaft can be done, a quiet starting is possible.

Acceleration running after starting can be done by stepping gradually deeper on the primary pedal 12 and then shifting a stage of the variable speed change gear 16 from low to high. This analogous to the case of a usual motor car in which an operator should release every time he shifts a stage of the variable speed change gear 16. The primary pedal 12 performs the function required to utilize without loss the inertia force which the rotor has developed by means of the electromagnetic clutch. A full control range through which the primary pedal 12 is shifted is divided into two stages. The control range of the first stage is the angular movement "b" from the upper starting point of the pedal to a ring head on the secondary pedal 12b wherein the pedal is shown in phantom in the drawing. The control range of the second stage is the angular movement "a" from the last-mentioned phantom position down to an end point shown by the lower phantom position. During the second stage the pedal 12b is carried down to its position shown in phantom. When the primary pedal is located on the control range of the first stage, the main driving motor 10 does not work. Therefore, when the primary pedal is located within the control range of the first stage, the inertia force of the rotor is the only source of power. As an acceleration running proceeds on the control range of the first stage, the inertia force of the rotor decreases after a time, so that it becomes necessary for the car to be driven by the main driving motor 10. This is more easily checked by sensing a force required for stepping on the pedal than by reading a gauge.

In operation the primary pedal 12 is continuously stepped on by an operator, then the primary pedal 12 is depressed to where the secondary pedal 12b becomes depressed, and the output controlling signal from generator 13 is generated. The output controlling signal from signal generator 13 commands an electric current of one or plural storage batteries to flow to the main driving motor 10, causing the main driving motor 10 to be turned. At the same time idling of a free gear 11 is stopped through the action of an electromagnetic force, and thereby the power of the main driving motor is transmitted to the rotor as the inertia force. As abovementioned the output controlling signal from generator 13 which is generated by adjusting the degree of stepping on the pedal 12 commands the output of the main driving motor 10 to be increased or decreased, and then to be controlled by two components, the batteries 1 and the reduction gearing 14. As the double pedal 12 continuously is stepped on and the output of the motor is increased, the rotor gains again much inertia force and correspondingly the rotation speed of the reduction gearing 14a reaches enough speed for the reduction gearing 14a to need a regulation of the speed.

Now the primary pedal 12 is shifted to the control range "b" of the first stage which is the primary position. Thereby the main driving motor 10 is stopped, and the free gear 11 again begins to run idle. Although an operator drives the car by controlling the speed within the control range of the first stage, when he judges from reading of a gauge or depending on perception that the rotation speed of the rotor should also be accelerated, and that a stronger force should be stored in the rotor, he may step at a convenient moment on the side pedal 12a as the car is coasting, to operate the main driving motor 10, by which he can accelerate rotation of the rotor. In short, the double pedal can be used properly according to a traffic situation or period of the speed, etc., and thereby both economy in power consumption and smooth running of the car can be achieved. Stopping of the car can be done by releasing the double pedal and stepping on a brake pedal (not drawn).

As abovementioned, the power equipment according to this invention does not only avoid a waste of gas, but also stores mechanical energy (angular kinetic energy) in the rotor. Therefore, if rotation of the rotor has been accelerated by stepping on the side pedal 12a, slow driving is sufficiently accomplished by coasting with inertia force of the rotor, and besides, generation of electric power can be positively continued. Accordingly, the car provided with the power equipment according to this invention is most convenient for driving on roads where traffic is slow.

The following is an explanation of a concrete mechanism of the car shown in FIG. 1, wherein to a part corresponding to the part shown in FIG. 1 the same reference symbol is affixed.

A power equipment shown in FIG. 2 is an engine in which a drum type vertical spindle rotor is centered, and around the drum type vertical spindle rotor, the starter-generator, the motor, the reduction gearing, and control device are mounted.

As shown in FIG. 2, the lower part of a frame 21 is supported on a lower body 20 through buffer springs 22, and 22, at the right and left, and the front and rear of the upper part of the frame is connected by springs 23 to an upper body (not drawn). The lower part and the upper part of the main shaft 2 is mounted rotatably at the center of the frame 21 through bearings 24, and 24. To the main shaft 2, a column sleeve 25 for support of a rotor 26 and a base for support of the rotor 26 are held. Around the base for support of the rotor 26, a cylindrical wall 27' is mounted.

As shown in FIG. 3, on the base 26, cylindrical partitions 27, 27, . . . are located concentrically, at equal intervals, around the column sleeve for support of the rotor, and are held to the base 26. Between cylindrical partitions 27, 27, . . ., a group of housings 28 of storage batteries 1 (uni-batteries) is closely located in the form of a honeycomb. This structure contributes to reinforcement of the rotor.

As shown in FIG. 2, on a bottom of each housings 28, a buffer gum mat 29 in the form of a washer is mounted, in such a location that a hole of the mat 29 coincides with a vent 30' made in the base 26.

However, on the upper end of both housing 28 and the cylindrical partitions, plug hook (not drawn), distributing wires for connecting between a pole 31 and a pole 31 of each uni-battery (not drawn), and a water supply device for supplying together to each uni-battery, etc., is mounted. Each uni-battery 1 is snugly put into its housing 28 so as not to shake, but in such a manner that loading and unloading can be done easily for exchange and repair. Uni-batteries of various sorts and types can be used as uni-batteries 1 for the rotor. In the embodiment shown in FIGS. 2, 3, and 5, lead storage batteries are used as storage batteries, these being most widespread, most developed, and lowest priced. There are various types of lead storage batteries which can be used for the rotor. It is important that uni-batteries 1 can withstand high speed rotation. This is not a difficult problem, because some storage batteries having an excellent resistance against earthquakes have been hitherto developed.

In FIG. 5, some examples of uni-batteries for use in the rotor are shown. An example shown in FIG. 5(a) and (b) is sandwich-typed, in which a positive pole plate 33, a pair of negative pole plates 34, and 34, a pair of partition plates 35, and 35, and a pair of glass mats 36, and 36, etc., sandwiched between a pair of supporting plates 37, and 37, and a pair of T-shaped holding plates 38, and 38, are disposed in a pipe-shaped electric vessel 32 with one end closed and strong elastic pipes 40, and 40 are inserted with application of pressure between the supporting plate 37 and the T-shaped holding plate 38. The uni-batteries for use as the rotor are substantially like the lead storage batteries heretofore in use. The voltage of each uni-battery is about 2 volt. Therefore, the voltage of the rotor consisting of the assembly of uni-batteries is naturally established by both the size of capacity and the number of the uni-batteries. The sort and the construction of the pole plates (for example, paste type, clad type, and so on) are also determined in the same manner as in the case of lead storage batteries heretofore in use. Furthermore, like the lead storage battery heretofore in use, sadles 41 of the pole plates 33, 34, and 34 are disposed on the bottom of the electric vessel 32, and the pole plates are entirely immersed in an electrolyte 42 to the upper end thereof. The space between the upper end of the pole plates 33, 34, and 34 and a cover 43 of the electric vessel is fully filled with the electrolyte 42 and the electrolyte 42 passes into the elastic pipes 40, 40 and so that there is no unoccupied space in the electric vessel. Furthermore the space between the upper end of the laminated pole plates 33, and 34 and a cover 43 of the electric vessel is very small compared with that of the type of lead storage battery heretofore in use. That is to say, between the upper end of the laminated pole plates and the cover 43 of the electric vessel there exists only such space as is needed for the necessary amount of the electrolyte this structural arrangement is necessary for preventing the electrolyte from leaking. In addition, a bent tube 44 and a cap in the form of a long-necked bent tube 30 for pouring the electrolyte and for ventilating air should be installed at the upper end of the electric vessel. Also both the bent tube 44 and the cap 30 for pouring the electrolyte and for ventilating air should be aligned toward the center of the rotor, so that the electrolyte may be restrained from running out when a centrifugal force is applied to the electrolyte in the direction of the arrow shown in FIGS. 5(b) and (d), and in FIGS. 6(a) and (b), when the rotor is rotating at high speed.

Figure 5A:
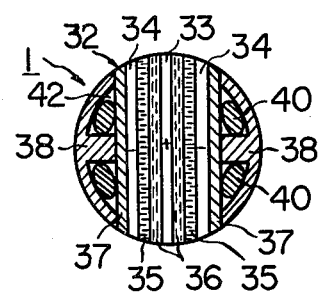
FIG. 5(a) is a transverse sectional view of a uni-battery used in the invention.
Figure 5C:
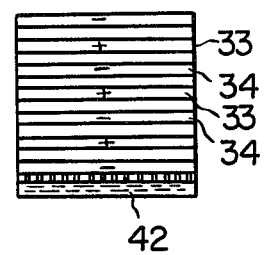
FIG. 5(c) is a transverse sectional view illustrating an another example of a uni-battery used in the invention.
Figure 5B:
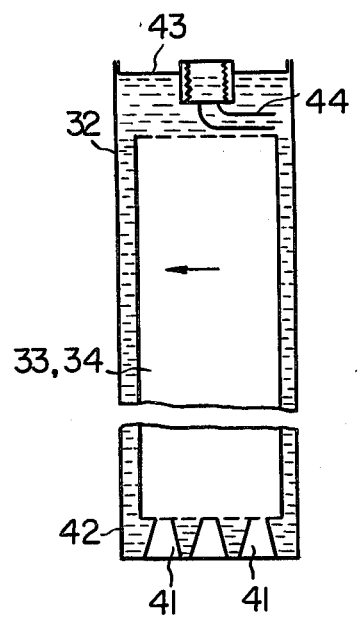
FIG. 5(b) is a longitudinal section thereof.
Figure 5D:
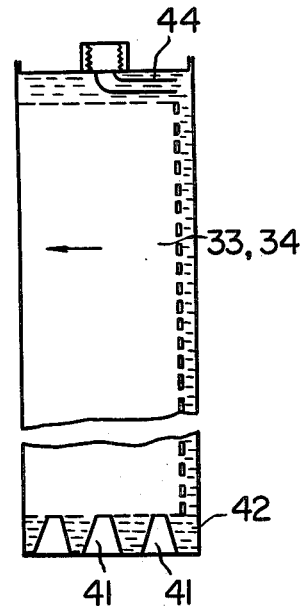
FIG. 5(d) is a longitudinal section thereof.
Figure 6A:
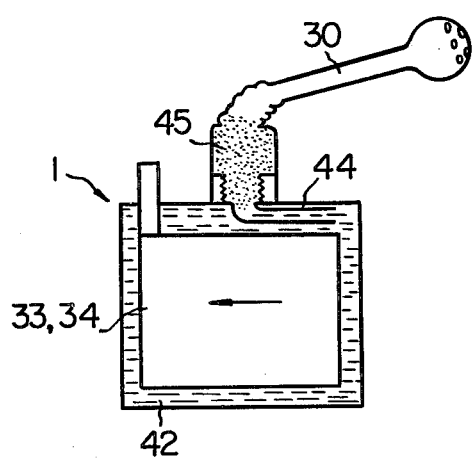
FIG. 6(a) (b) is a longitudinal sectional view of an improved uni-battery which is provided with a liquid leakage checking device.
Figure 6B:
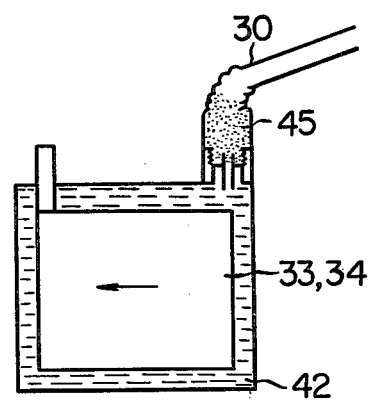

Another embodiment is shown in FIGS. 5(c) and (d), wherein the parts common to the abovementioned example shown in FIGS. 6(a) and (b) is shown with like reference symbols. In this example, positive pole plates 33 and negative pole plates 34 are alternately laminated in the direction of a centrifugal force, with insulating plates interposed therebetween, and the laminated plates are pressed and held against the side wall of the electric vessel on the side close to the center of the rotor by a porous planiwall, and between the porous planiwall and the side wall of the electric vessel on the same side as the planiwall, space for placing the electrolyte 42 is provided. It is recognized that a uni-battery in which pole plates have a shape as a volution, a wave, a concentric cylinder, and so on, can be used as a battery for the rotor.

An example of a uni-battery for the rotor modified from a type of lead battery heretofore in use is shown in FIGS. 6(a) and (b), which is characterized in that it is provided with the cover 43 of the electric vessel and has the bent tube 44 and the cap in the form of a long-necked bent tube 30 for pouring the electrolyte and ventilating air. Also the space between the upper end of the laminated pole plates and the cover of the electric veseel is small in order to inhibit the electrolyte from leaking an being dispersed under the influence of the centrifugal force.

In the cap in the form of a long-necked tube 30, a sponge 45 is plugged in which excess liquid is temporarily stored and by which impurities entering through an exhaust pipe are filtered.

Figure 7:
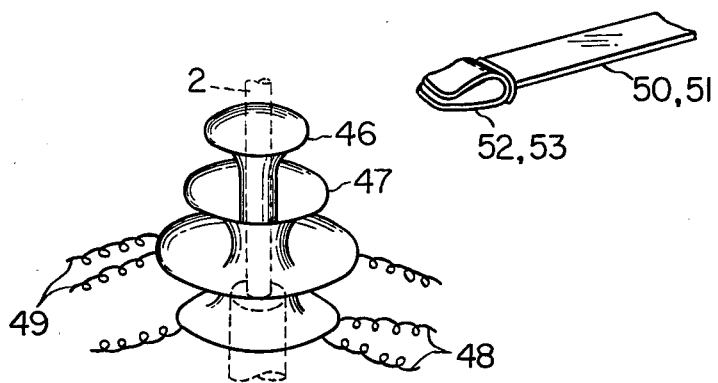
FIG. 7 is a perspective diagram of a collector plate, shown together with a incoming lip.

As seen in FIG. 7, on the upper part of the main shaft 2, there is mounted double a pair of connector plates in the form of a two-storied horn, one of the plate 46 being plus and the other plate 47 being minus, and to the under stories of the connector plates, there are connected plus wiring 48 and minus wiring 49 connecting with a group of uni-batteries. The connector plates 46 and 47 are put on the main shaft 2 and held so that the connector plates can be rotated with the main shaft 2.

On the outer skirts of the upper stages of the connector plates 46 and 47, receiving clips 52 and 53, which are mounted on the end of one pair 50 and 51 of receiving poles which are plus and minus respectively, shown in FIG. 7, are engaged and held and through them an electric current is sent.

The other ends of the plus and minus receiving poles 50 and 51 having suitable elasticity are held on the upper part of the frame 21 and connected through wiring to controlling signal oscillators 6a, 13a, etc.

As shown in FIG. 2, on the upper end of the main shaft 2, the speed controlling or adjusting device 3a with an electromagnetic brake is mounted, which has the function of restraining automatically the rotor from rotating at an excessive speed and the function of transmitting the oridinary rotary speed through a control device.

On the under part of the main shaft 2, a bevel gear 54, turning with the main shaft, is held with a set pin. The bevel gear has a contact surface for receiving rotation motor from the main driving motor 10 and a contact surface for transmitting rotation motion to the reduction gearing 14a. The set pin may be removable so that the power of the main driving motor 10 can be directly transmitted to the reduction gearing 14a.

The bevel gear 11a of the main driving motor 10 is the electromagnetic free gear which is connected to the motor shaft only in case of secondary pedal 12b being stepped on and runs idle when the secondary pedal 12b is idle. Therefore there is no necessity of aligning the rotation speed of the rotor and that of the main driving motor. By virtue of the bevel gear 11a, the main driving motor 10 is prevented from being rotated when not in use and consumption of electric power therein is prevented when not in use.

The rotation speed of the main driving motor 10 itself is controlled through the controlling signal oscillator by the output signal of the secondary pedal 12b. In the situation of the secondary pedal 12b being released, the electric source of the main driving motor 10 is removed from the main driving motor 10, and the main driving motor 10 is stopped.

The output speed of the electromagnetic clutch 15 whose driving shaft is the shaft of the reduction gearing 14a is reponsively adjusted by the speed signal of the primary pedal 12 which is sent to the electromagnetic clutch 15 through the control oscillator 18a. When the primary pedal 12 is not stepped on, the electromagnetic clutch 15 is not functioning. Therefore the connection between the driving shaft of the reduction gearing 14a and the driven shaft of the clutch is cut.

On the outer circumference of the rotor base 26, a large gear 55 is fixed, and the large gear 55 is connected to a toothed wheel 57 of the starter-generator 4 through an intermediate toothed wheel 56. The oscillator 6a is provided with a starter-generator switch 58 which is worked by the starter signal of the foot-treadle button 5 for starting.

Figure 8:
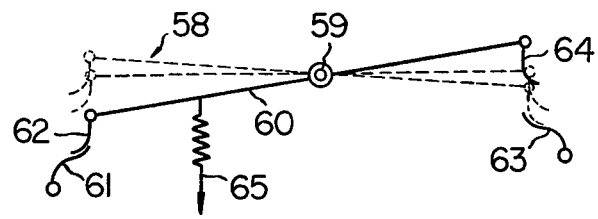
FIG. 8 is a view explaining how a starter-generator switch.

An example of the switch 58 is shown in FIG. 8, wherein a lever 60 rests on a fulcrum 59, and the lever 60 is provided with a contactor 62 coming into contact with a contactor 61 for generating on one end thereof and a contactor 64 coming into contact with contactor 63 for starting on other end thereof. The lever 60 is sprung by a spring 65 in such a way that the contactor 61 comes into contact with the contactor 62. When the foot-treadle button 5 for a starting of the starter-generator is stepped on, the level 60 turns and the contactor 63 comes into contact with the contactor 64. The oscillator 6a has the function of sending the information concerning a rotation speed, a capacity, and charge of the storage battery and so on the the gauge and controlling automatically on-off of a switch for generating, as occasion demands, for example, when the storage battery is over-charged.

The tension spring 23 and buffer spring 22, which support the frame 21, are necessary for installing the frame 21, particularly a frame of a car which is jolted, for shock absorption. On the periphery of the frame 21, a balance weight is mounted, whereby the balance of the storage battery 1 is adjusted and rocking of the storage battery 1 while rotating is alleviated.

Figure 9A:
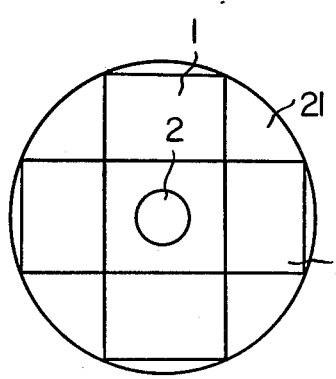
FIGS. 9(a), (b), (c) and (d) are views of rotors comprising an improved battery of conventional one.
Figure 9B:
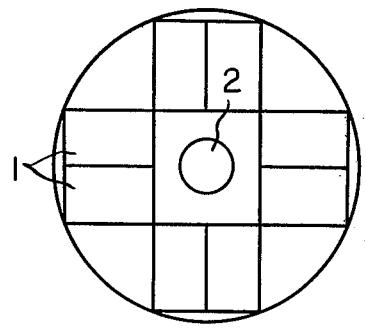
Figure 9C:
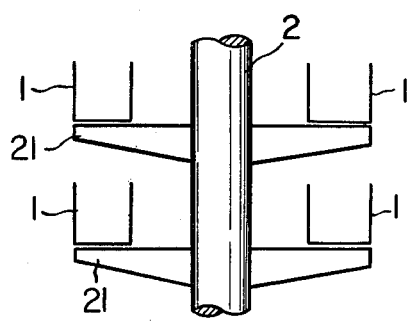
Figure 9D:
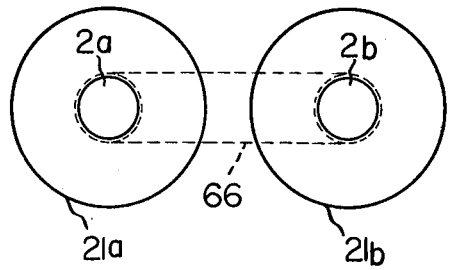

Another example of layout of a battery rotor which is composed of improved batteries of conventional type is shown in FIGS. 9(a), 9(b), 9(c) and 9(d). In FIG. 9(a), there is shown a battery rotor in which four batteries are installed in four places. In FIG. 9(b), there is shown a battery rotor in which eight batteries are paired off in four places. In FIG. 9(c), there is shown a battery rotor in which batteries are installed in two stages, and in FIG. 9(d) there is shown a battery rotor 21a with a main shaft 2a. Rotor 21a contains a battery. The main shaft 2b of another rotor 21b containing a battery is connected to shaft 21b through a belt 66. The method of fixing the necessary attachment around the vertical axis is basically the same as that shown in FIG. 2 wherein a housing of batteries is held to the frame 21.

The model shown in FIG. 9 can be applied to the model comprising the independent unit of batteries. And the said system of interlocking plural rotors can be applied to the engine system of various cars modified according as the actual circumstances of various vehicles and working cars and so on.

In the abovementioned embodiment, the electromagnetic clutch and the main driving motor, and so on are directly controlled by a driver through the specific double pedal. However, the control system need not always be that system, and besides the said system, there are several other systems.

For instance, there are the following systems:

(1) a control system in which driving the rotor by the main driving motor is automatically done through a speed-regulator, and a driver controls the speed only by means of the electromagnetic clutch;

(2) a control system in which the inertia force of the rotor is utilized only for generating and an output of the main driving motor is directly used as the power and so on. Moreover, by using both the power of the main driving motor and the inertia force of the rotor, an output can be doubled as occasion demands.

Moreover with the control system a small-sized gasoline engine may be provided protect against sudden engine trouble. This would involve the use of a small bevel gear meshed with the bevel gear 14a, so that according to circumstances the rotor can be driven by the small-sized gasoline engine and thereby generating electricity and accumulation of inertia force in the rotor, so that the car can coast. Besides this, a system known as a hybrid system in which plural energy sources are utilized may be applied on a full scale.

The power equipment according to this invention may be formed so that batteries can be exchanged. That is, type and size of the new-type uni-storage battery for the rotor or the improved type of the conventional uni-storage battery may be unified as in small numbers as possible so that a wasted battery can be exchanged into a charged battery in a filling station. Furthermore, in the power equipment according to this invention, the rotor may be hermetically housed by a vacuum casing so that the rotor can coast more efficiently. Furthermore, by means of an electromagnetic bearing or by means of an electromagnetic force cushion lying between a bottom of the rotor and an inside of a bottom of the frame, a fly-wheel effect is elevated to the highest level.

The rotor containing plural storage batteries or uni-batteries in this invention is very heavy. Although to start and accelerate the weighty rotor, an mighty electrical power is required, a very mighty force is not necessary for the rotor which has gained the rotary speed to some extent to be accelerated again, as the rotor gains an inertia that the rotor is difficult to stop and continues to coast persistently once it begins to rotate. As the rotor acts as flywheel, a weight of batteries contained in the rotor does not become a shortcoming. Rather, the heavier the weight of the rotor is, the larger an amount of an inertia force stored in the rotor is, and thereby sustaining power is advanced.

Therefore, in the power equipment according to this invention, as the dead-weight of batteries can be utilized as the weight for flywheel without the specific heavy flywheel an output strong and stable can be gained, and furthermore electric power can be saved with.

By the way, it is necessary for making the power equipment according to this invention most effective that the flywheel effect of the rotor is utilized to the maximum.

Moreover consumption of electric energy of the storage batteries in the rotor should be kept at a minimum.

For that reason, it is necessary that the rotor be accelerated by an exterior power as much as possible or that unused generated energy is withdrawn and utilized again.

For instance, there are the following ways: (1) that by using generated electricity at an appropriate place, before or during operation, an inertia force of the rotor is accumulated; (2) that by utilizing a specific engine besides a hybrid system or through a manual device (not drawn) the rotor is accelerated.

Furthermore there is a way that the rotor is accelerated by utilizing useless energy picked up during deceleration in the case of car. To be concrete, while the speed of a car while coasting becomes excessive on a sloping road or while the speed of a car running on a flat road is slowed down, that is, while an engine brake should be operated in the conventional car or while a brake pedal is stepped on by operating an interlocking device (not drawn) which interlocks a braked axle and the rotor and which is attached to a brake pedal, the excessive energy can be utilized for acceleration of the rotor.

By these ways, the power equipment according to the invention can be made most effective, whereby in the case of a car, the running distance is lengthened.

What is claimed is:

1. A power equipment comprising a rotor containing storage battery means, and adapted to function as a flywheel, a starter-generator, a main driving motor connected with the storage battery so as to be started by electrical power of the storage battery means and drivingly connected to the starter-generator, means for transmitting inertia force of the rotor to the generator, and means connecting a terminal of the generator to a terminal of the storage battery means, wheel means drivable by the main driving motor, reduction gearing means and an electromagnetic clutch, said reduction gearing means and electromagnetic clutch being interposed between the main driving motor and the wheel means.

2. A power equipment as claimed in claim 1, in which the rotor has cylindrical partitions located concentrically at equal intervals around a column sleeve for a support of the rotor, said column sleeve being held to a base of the rotor, and a group of housings of storage betteries is closely located in the form of a honeycomb between the cylindrical partitions, and a buffer gum mat in the form of washer is mounted on the bottom of each housing in such a location that a hole of the mat coincides with a vent in the base.

3. A power equipment as claimed in claim 1, in which the storage battery has a positive pole plate, a pair of negative pole plates, a pair of partition plates, and a pair of glass mats, sandwiched between a pair of supporting plates, and a pair of T-shaped holding plates are disposed in a pipe-shaped electric vessel with one end closed and strong elastic pipes are inserted with the application of pressure between the supporting plate and the T-shaped holding plates.

4. A power equipment as claimed in claim 1, in which the storage battery has positive poles and negative pole plates which are alternatively laminated with the direction of a centrifugal force, and between which isolating plates are interposed, and the laminated plates are pressed and held against the side wall of an electric vessel on the side close to the center of the rotor by a porous planiwall, and between the porous planiwall and the side wall of the electric vessel on the same side as it, space for placing an electrolyte is formed.

5. A power equipment as claimed in claim 1, in which the storage battery provided with a cover of an electric vessel and a cap in the form of a long-necked bent tube for pouring an electrolyte and ventilating air, and space between the upper end of the laminated pole plates and the cover of the electric vessel is tightly closed in order to inhibit an electrolyte from leaking and being dispersed under influence of a centrifugal force and in the cap in the form of a long-necked tube, a sponge is plugged.

6. A power equipment as claimed in claim 1, in which the storage battery has a structure that it is provided with a cover of an electric vessel having a bent tube and a cap in the form of a long-necked bent tube for pouring an electrolyte and ventilating air, and space between the upper end of the laminated pole plates and the cover of the electric vessel is tightly closed in order to inhibit an electrolyte from leaking and being dispersed under influence of a centrifugal force and in the cap in the form of a long-necked tube, a sponge is plugged.

* * * * *